United States Patent [19]

Boltinghouse et al.

[11] 4,074,580

[45] Feb. 21, 1978

[54] ELECTROSTATIC PICKOFF SYSTEM FOR BALL GYROS OF THE ELECTROSTATIC LEVITATION TYPE

[75] Inventors: Joseph C. Boltinghouse, Whittier; James L. Atkinson, La Mirada, both of Calif.

[73] Assignee: Rockwell International Corporation, El Segundo, Calif.

[21] Appl. No.: 642,502

[22] Filed: Dec. 19, 1975

Related U.S. Application Data

[63] Continuation of Ser. No. 47,506, June 18, 1970, abandoned.

[51] Int. Cl.² .................. G01C 19/28; G01C 19/30; G01C 19/46
[52] U.S. Cl. .................................... 74/5.6 D; 74/5.41
[58] Field of Search .............. 308/10; 74/5 R, 5, 5 F, 74/5.1, 5.34, 5.4, 5.5, 5.6 R, 5.6 A, 5.6 B, 5.6 C, 5.6 D, 5.6 E, 5.7

[56] References Cited

U.S. PATENT DOCUMENTS

| 3,149,276 | 9/1964 | Hirsh et al. | 74/5.6 E X |
|---|---|---|---|
| 3,258,977 | 7/1966 | Hoffman | 74/5 X |
| 3,313,161 | 4/1967 | Nordsieck | 74/5 X |
| 3,320,817 | 5/1967 | Iddings | 64/5.6 D |
| 3,412,618 | 11/1968 | Staats | 74/5.7 |
| 3,428,789 | 2/1969 | Richard | 74/5.34 X |
| 3,477,298 | 11/1969 | Howe | 74/5.6 E X |
| 3,496,780 | 2/1970 | Clavelloux et al. | 74/5.7 X |
| 3,545,287 | 12/1970 | Smith | 74/5.7 X |
| 3,596,523 | 8/1971 | Clark | 74/5.7 X |
| 3,704,407 | 11/1972 | Lindsey | 74/5.4 X |
| 3,847,026 | 11/1974 | Boltinghouse et al. | 74/5.6 D |
| 3,854,341 | 12/1974 | Quermann | 74/5.7 |
| 3,902,374 | 9/1975 | Hoffman et al. | 74/5.7 X |
| 3,906,804 | 9/1975 | Atkinson et al. | 74/5.7 |
| 3,955,426 | 5/1976 | Klinchuch | 74/5.6 D |

Primary Examiner—Samuel Scott
Assistant Examiner—Don E. Ferrell
Attorney, Agent, or Firm—H. Fredrick Hamann; Rolf M. Pitts; George Jameson

[57] ABSTRACT

The invention is directed to an electrostatically supported ball type gyroscope pickoff system for determining the attitude (i.e., angular orientation) of the ball spin axis relative to the gyroscope case for any arbitrary attitude. The gyroscope case is provided with a set of electrostatic electrodes arrayed in three-dimensional space. A levitating electric field is maintained between the ball and the electrodes. The ball is so constructed as to be unbalanced about its spin axis. Under such conditions, as the ball spins, it orbits, and its surface alternately advances towards and recedes from any given electrode at the spin frequency, producing a field modulation signal. The phase pattern of the modulation signals at the several electrodes is a unique function of the attitude of the spin axis relative to the electrodes. Means are provided for processing the modulation signals so as to determine the attitude of the ball.

14 Claims, 19 Drawing Figures

INVENTORS
JOSEPH C. BOLTINGHOUSE
JAMES L. ATKINSON
BY
Edward Dugas
ATTORNEY

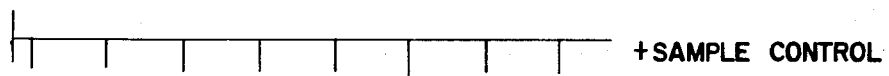
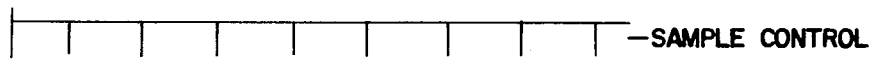
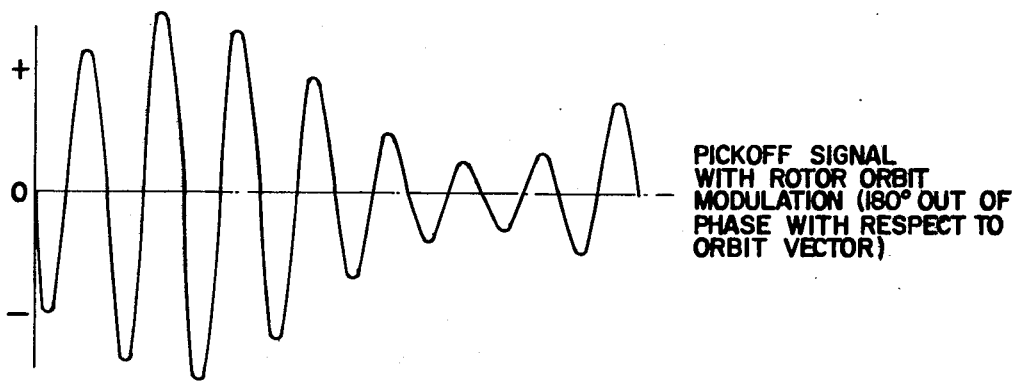
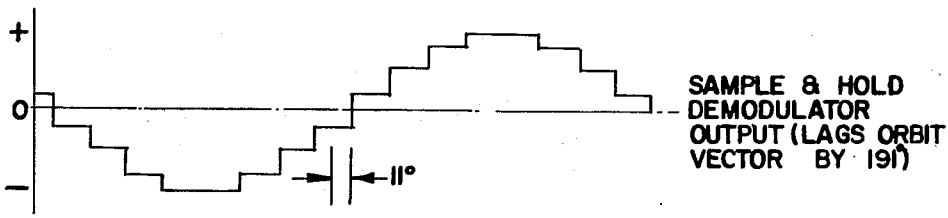
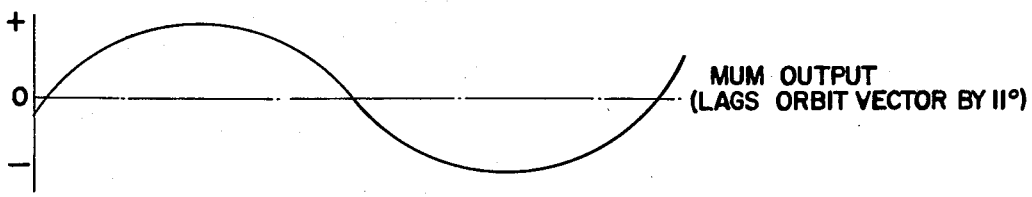

ELECTROSTATIC PICKOFF SYSTEM FOR BALL GYROS OF THE ELECTROSTATIC LEVITATION TYPE

This is a continuation of application Ser. No. 47,506 filed June 18, 1970, now abandoned.

BACKGROUND OF THE INVENTION

1. Field of the Invention

The field of the invention is related to gyroscopes of the electrostatic pickoff type and, more particularly, in the provision of an all-attitude (wide angle) pickoff for determining the attitude of the ball spin axis relative to the gyroscope case.

2. Description of the Prior Art

Gyroscopes exist in the prior art in which a spinning ball is supported or levitated in a high vacuum by electrostatic forces. For this purpose, typically three or more opposed pairs of spherical-surfaced electrodes are provided in a closely fitted cavity and circuit means are provided such that, if the ball becomes uncentered, i.e., recedes from one electrode of a pair and advances towards the other, the electrostatic force is increased and decreased, respectively, at the two electrodes, urging the ball towards center. For an example, see U.S. Pat. No. 3,334,949, issued Aug. 8, 1967, entitled "Electrostatic Bearing" by James L. Atkinson, one of the inventors of the present invention. In some cases, the same electrodes perform sensing and forcing functions; in others, for example, U.S. Pat. No. 3,482,455, issued Dec. 9, 1969, entitled "Electrostatic Levitation Control System" by J. C. Boltinghouse et al, different electrodes are used for sensing and forcing.

In using an electrostatic ball gyroscope for many purposes in flight control and in inertial navigation, it is desirable that the case be fixed to the frame of the carrying craft (ship, aircraft, missile, etc.) as distinguished from being mounted on a three-axis stabilized platform. Such manner of use does away with the complex mechanical elements and gimbal servo systems of a stabilized platform. In frame-fixed, so-called "strapdown" systems, the ball spin axis remains angularly fixed in inertial space while the craft may assume any arbitrary attitude (angular orientation).

In such strapdown systems, the problem is presented of accurately measuring the attitude of the gyro case, which is fixed to the craft frame relative to the ball spin axis. For practical purposes, the accuracy of sensing of the spin axis must be of the order of one milliradian (3 4 minutes of arc) or better. One class of methods and apparatus which has been proposed for spin axis sensing is the optical class. Some sort of optical pattern is put on the ball and a plurality of optical pickoffs are provided, sensing the changing orientation of the pattern. A typical system of this sort is U.S. Pat. No. 3,154,953 issued Nov. 3, 1964, entitled "Gyroscopic Control Apparatus," by R. D. Ormsby. Such systems suffer certain disadvantages. First, the optical system is cumbersome and bulky. Second, it is exceedingly difficult to provide a pattern on a sphere, which may be only a centimeter or so in diameter, which yields sufficient angular resolution. Third, even given a fine enough pattern, it is almost impossible to locate it accurately enough relative to the actual spin axis of the ball. Until the present invention, no really practical all-attitude pickoff for electrostatic ball gyros has been devised.

SUMMARY OF THE INVENTION

According to one aspect of the invention, there is provided an electrostatically supported ball gyro with an all-attitude pickoff which does away with any need for markings or patterns of any sort on the ball. Instead, the arrangement is comprised as follows: p The ball is made unbalanced in a plane normal to the axis of major moment of inertia so that when the ball spins, it orbits. That is, as viewed from any fixed point in the plane normal to the spin axis, the surface of the ball advances and recedes at the spin frequency.

The ball is disposed within a spherical cavity defined (typically) by four pairs of diametrically opposed octantal electrodes. A levitating servo circuit means is provided for each pair to supply a levitation electric field between the ball and each electrode in that pair such that upon departure of the ball from a centered position (thereby increasing the average gap distance from one electrode of a pair and decreasing the gap distance from the other) the voltages across the gaps are respectively increased and decreased, to urge the ball toward center, i.e., to levitate the ball. (The levitation action just described takes place whether a balanced or unbalanced ball is used.)

The effect of the ball unbalance is to modulate, at the spin frequency, the electrical field between the ball and each electrode. The orbital motion described is most pronounced when the spin frequency is made to be well above the levitation-servo bandpass frequency. The amplitude and phase of the modulations at the several electrodes depends on the orientation of the ball spin axis relative to the electrodes. For every attitude of the spinning ball relative to the electrodes, there will be a unique modulation pattern. By suitably interpreting this pattern, the attitude of the ball relative to the case can be determined.

It is important to note that provision of a pickoff system in accordance with the present invention requires nothing in the way of added mechanical or electro-optical elements. The structure of the gyroscope itself contains nothing in addition to what is needed for levitation alone; a great advantage as regards productivity and cost. All that the invention requires is additional circuits to process the signals from the existing electrodes.

It is therefore an object of the present invention to provide an electrostatically supported gyroscope with an attitude pickoff system which requires no added mechanical or optical elements, but instead requires only the electrodes provided for levitation.

It is another object of the present invention to provide an electrostatically supported ball gyro with an attitude pickoff based on kinematical rather than optical principles, and making use of the modulation of the electrical field in the levitation channels by an unbalanced ball, viz. one in which the center of mass is displaced laterally from the ball spin axis.

It is an additional object of the present invention to provide an electrostatically supported ball gyro comprising a set of eight levitation electrodes in regular-octahedral symmetry defining a non-orthogonal set of four levitation axes.

It is another object of the present invention to provide an electrostatically supported ball gyro in which the ball is so constructed as to have its center of mass displaced laterally from a major axis of the moment of inertia, so that the ball orbits when spinning, the amount of such displacement being such as to produce substantial modulation of the electrical field between the levitation electrodes and the ball.

The foregoing objects of the present invention will become more apparent and better understood when taken in conjunction with the following description and accompanying drawings, throughout which like characters indicate like parts and which drawings form a part of this application.

BRIEF DESCRIPTION OF THE DRAWINGS

An embodiment of the invention and diagrams illustrative of its manner of functioning appear in the accompanying drawings, in which:

FIGS. 6a to 6f are diagrams showing the character of the signals at various points in the circuits of FIG. 5.

DESCRIPTION OF THE PREFERRED EMBODIMENTS

Figure 1:
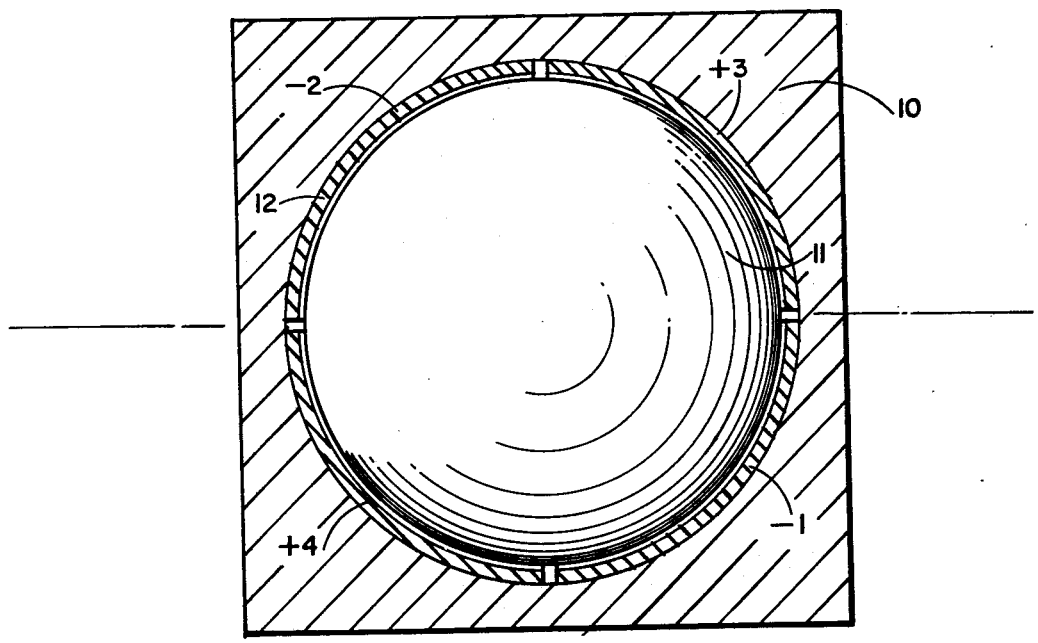
FIG. 1 is a center section view of an electrostatic gyroscope to which the invention is applicable.
Figure 2:
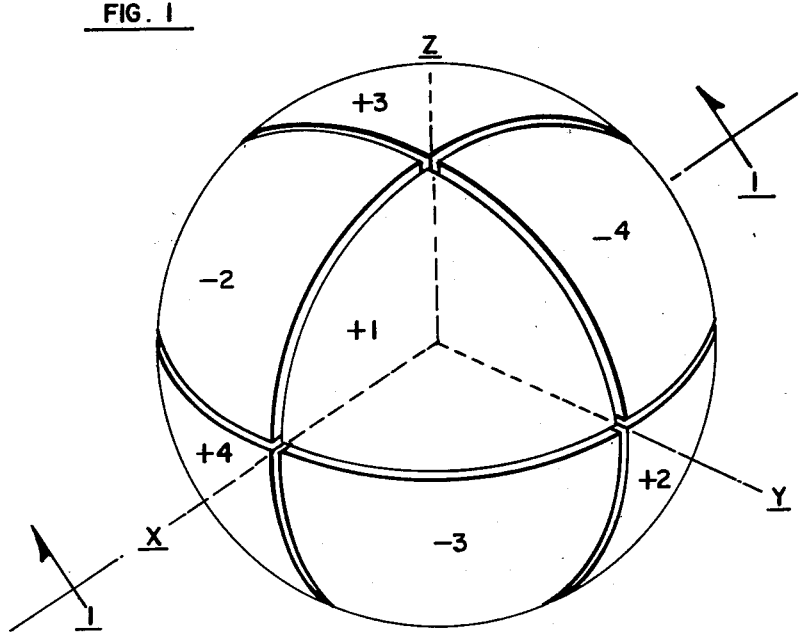
FIG. 2 is an isometric view of the electrode assembly of the gyroscope of FIG. 1.

FIGS. 1 and 2 show schematically a gyroscope comprising a nonconducting ceramic case 10 with a spherical internal contour and a conductive-surfaced spinning ball 11. Within the case is a spherical cavity 12 lined with eight octantal electrodes, shown, as seen from the outside, in FIG. 2, which are denoted, for convenience in analysis, as $+1, -1, +2, -2, +3, -3,$ and $+4, -4$. Each pair, e.g., $+1$ and $-1$, are diametrically opposed. The electrode surfaces may be thought of as the projection, upon a sphere, of the eight faces of a regular octahedron. The axes of the electrode set are taken as $x, y, z$ in FIG. 2. The $x$ and $z$ axes define the plane along which a section is taken for FIG. 1. A vacuum exists within the spherical cavity 12.

Each pair of electrodes, e.g., $+1$ and $-1$, are connected into a levitating servo system, to be described, such that departure of the ball 11 from the center of the spherical cavity 12 which, for example, decreases the gap at $+1$ and increases it at $-1$, results in voltage decrease and increase respectively to center the ball. It will be noted that four non-orthogonal levitation channels are provided, the angle between any pair of channels being approximately 110°.

Figure 3:
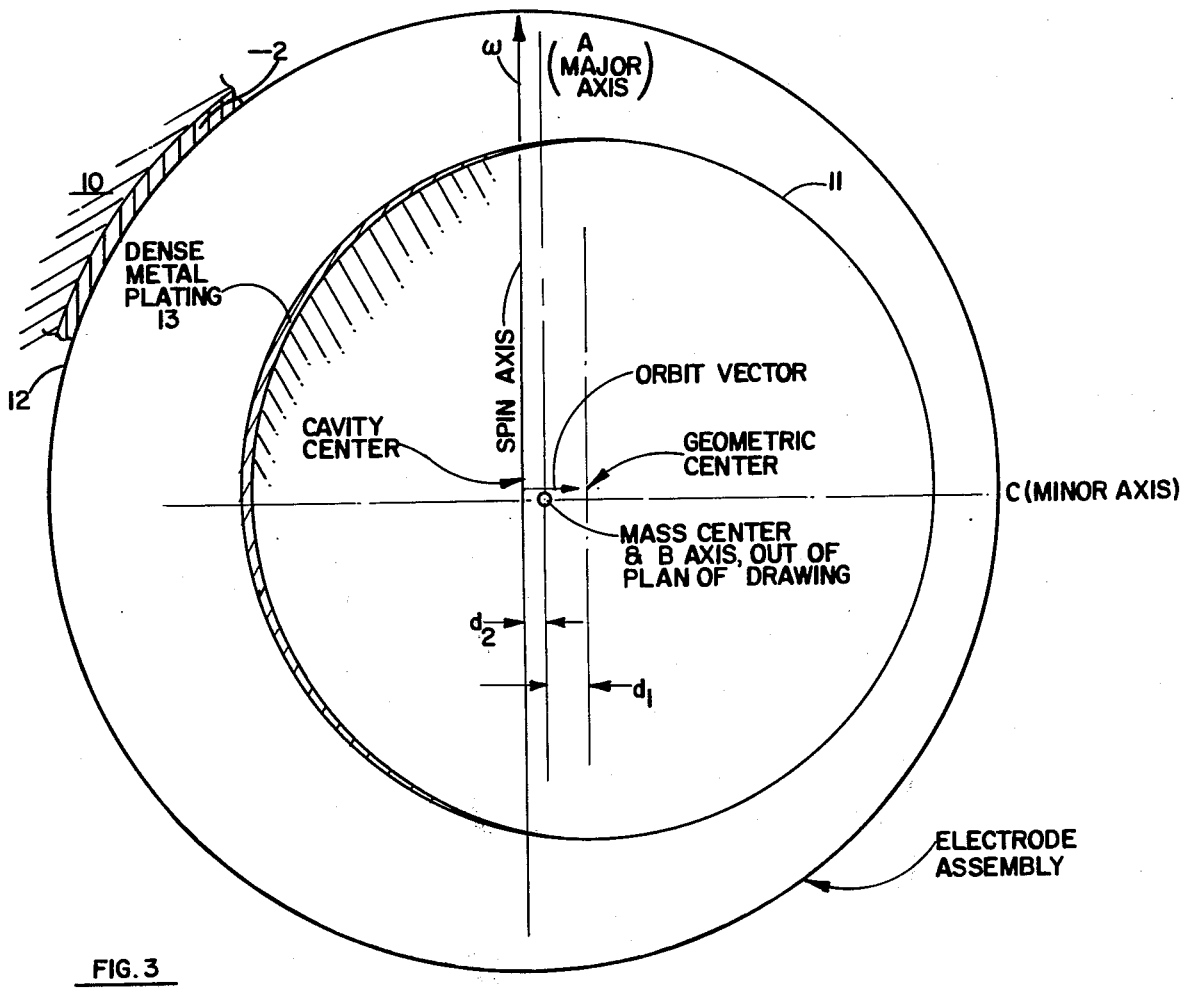
FIG. 3 is a schematic view of the gyroscope rotor ball constructed in accordance with the invention.

FIG. 3 is a schematic central cross-section of the ball 11, which is typically a solid mass of beryllium or other low-density material, of the order of 0.4 inch in diameter. Its surface is ideally a true sphere. One side is provided with a very thin (typically 4 micro-inch) layer of a dense metal such as tantalum, as indicated at 13, which displaces the center of mass a distance $d_1$ of the order of 16 micro-inches away from the geometrical center, or about 5 percent of the typical 300 micro-inch gap, and the mass center a distance $d_2$ approximately 0.34 micro-inches from the cavity center. The dense metal layer establishes the C axis or the AB plane. In other words, it establishes an axis of major moment of inertia A, and two minor axes, B,C. The mass unbalance is almost entirely radial. This is important because mass unbalance along the spin axis is a source of error torque under the acceleration of gravity and inertial accelerations. Radial mass unbalance is not a source of error torque.

The ball typically spins at about 2550 rps. A motor, not shown, is provided for initially bringing the ball up to speed. The spin frequency is far above the servo natural frequency (typically about 800 Hz), therefore, the ball spins very nearly on the center of mass, the discrepancy, D, being of the order of 0.36 micro-inches. The geometrical center of the ball orbits in a circle typically of 16 to 20 micro-inches radius. (It will be appreciated that if the servo were infinitely stiff, the ball would spin about its geometrical center and the present pickoff system would not be operable).

The invention is not dependent on use of any particular levitation circuit. A specific electrostatic levitation circuit will be described to complete the teaching of a preferred embodiment. The levitation circuit's function is to servo-control the voltages at the eight electrodes so as to keep the ball centered.

Primarily, it is pointed out that the force F exerted by an electrode on the ball is given by the expression:

$$F = k \text{ (voltage/gap)}^2 \qquad (1)$$

It can be shown that if (as is this case) only one frequency is involved in the levitation, the force exerted by one electrode is simply proportional to the current-squared supplied to the electrode, independent of the gap; thus:

$$F = ki^2 \qquad (2)$$

Figure 4:
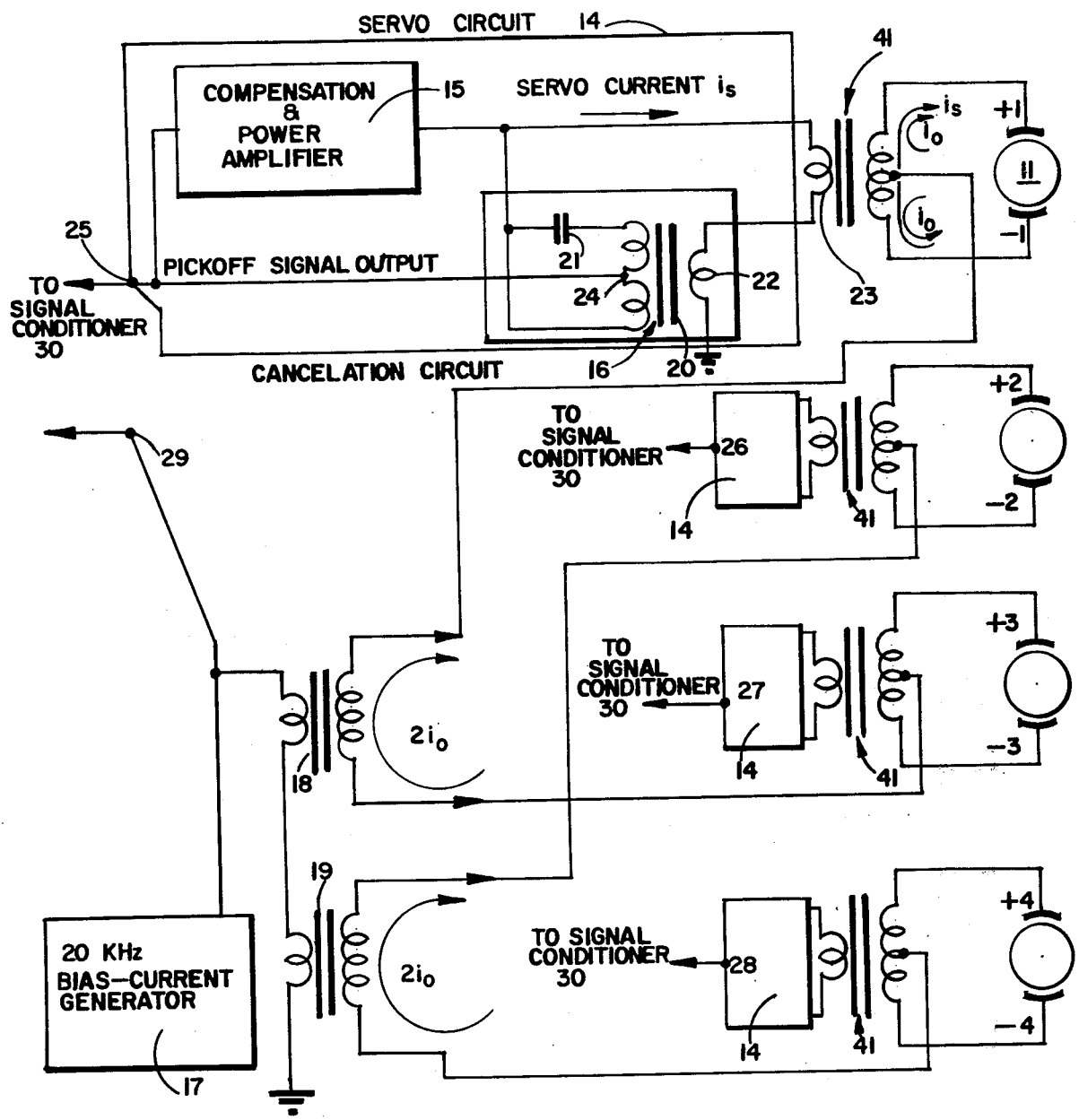
FIG. 4 is a diagram of the rotor levitation circuits.

Reference is made to FIG. 4, which shows a complete levitation circuit for one channel (electrodes $+1$ and $-1$), the circuits for the other three channels being identical. A center-tapped transformer 41 couples the electrodes, $+1$ and $-1$, to a servo circuit 14, including a compensation and power amplifier 15 and a cancellation circuit 16 (to be described). A bias current generator 17 supplies, via transformers 18 and 19, a bias voltage at the center tap of transformers 41.

The current supplied to the electrodes consists of two parts: a constant current bias $2i_o$ and a servo current $i_s$. From FIG. 4 it can be seen that the bias currents going in and out of the transformer 41 center taps are equal regardless of ball position. While it is not immediately obvious, it can be shown that each of these bias currents is divided into two equal parts $i_o$ by the high inductance of the gyroscope transformers and, again, this effect is independent of ball position. It follows that the net force exerted on the ball for one axis is given by:

$$F = k(i_o + i_s)^2 - (i_o - i_s)^2 = 4ki_oi_s \qquad (3)$$

The force along a levitation axis is then linearly proportional to the servo current, and can be made proportional to the pickoff signal. In typical cases the compliance of the servo levitation is of the order of a few micro-inches per g.

The levitation system derives its pickoff signal from the transformer winding 23. If the ball 11 is uncentered, the bias currents $i_o$ will produce a voltage across the transformer winding 23. This voltage is called the pickoff signal and will be proportional to the ball displacement from center. However, added to the pickoff signal will be another voltage due to the servo current $i_s$ coming from the power amplifier 15. The cancellation circuit 16 is required to eliminate servo contamination of the pickoff signal. The cancellation transformer 20 is wound on the same kind of core as transformer 41, and the windings 22, 23 and 24 all have the same number of turns. By properly adjusting the capacitance of capacitor 21, the servo current $i_s$ will encounter exactly the same impedance in flowing through winding 22 as it does through winding 23, and the voltages produced by the current across windings 22, 23, and 24 will all be identical. Winding 24 subtracts from the pickoff signal output 25 any voltage due to the servo current. The levitation signal output appears at terminals 25, 26, 27, and 28 (FIG. 4) and the bias current generator furnishes an output at terminal 29.

Figure 5:
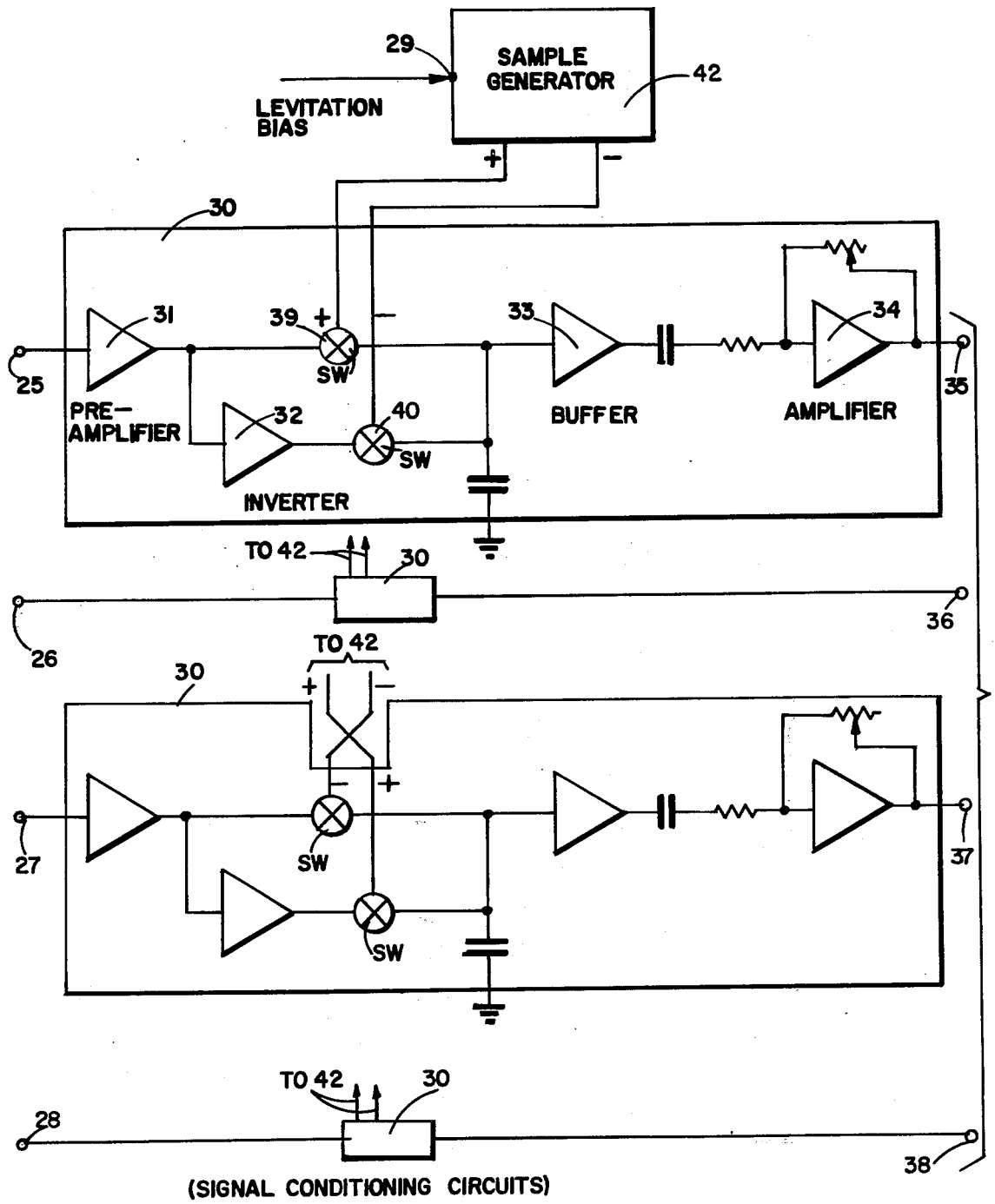
FIG. 5 is a diagram of signal conditioning circuits.

The four pickoff signals are demodulated in what is termed a signal conditioner, which is shown in FIG. 5. It is comprised of four identical circuits 30 each having a preamplifier 31, an inverter 32, a buffer 33 and an adjustable gain amplifier 34. A sample generator 42 supplies pulse signals to the circuits via switches 39 and 40. The outputs of circuits 30 are called mass-unbalance modulation or MUM signals and appear at terminals 35, 36, 37 and 38. These signals are simply the modulation envelopes of the four pickoff signals.

Referring to FIGS. 6a through 6f which illustrate the nature of the signals at the several parts of the circuit of FIG. 5, the pickoff signal (at input terminal 25) is shown as a modulated sine wave in FIG. 6d. FIG. 6a shows the levitation bias signal (20 KHz), and directly below, in FIGS. 6b and 6c, the corresponding output pulses from the sample generator.

The sample-and-hold demodulated output (FIG. 6e) appears at the output of buffer 33, and is amplified and inverted at the amplifier 34 to produce the MUM signal (FIG. 6f) which, as stated, is simply the modulation envelope of the input signal. It is to be noted that the MUM signals typically lag the orbit vectors (of FIG. 3) by 11°. This is explained by the fact that the sample-and-hold technique produces a stair-step output. With 40,000 samples per second, the 2550 Hz output lags one-half a step:

$$\text{Lag} = \tfrac{1}{2} \cdot (2{,}550/40{,}000) \cdot 360° = 11° \tag{4}$$

The spin axis attitude information is contained in the relative phase and amplitude relationships of the four MUM signals appearing at terminals 35, 36, 37, and 38 in FIG. 5.

There are various ways in which such information can be processed to yield the desired information; namely the attitude of the spin axis of the ball relative to the case. The preferred embodiment for determining the spin axis attitude from the four MUM signals uses only their phase relationships.

Figure 7:
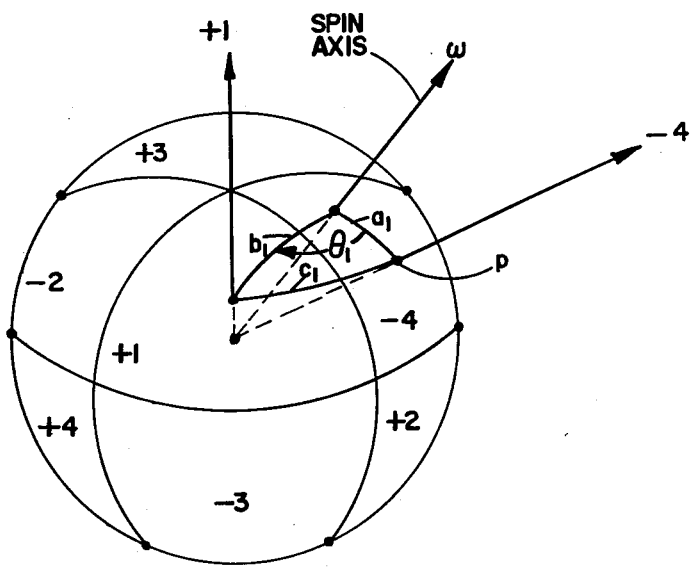
FIG. 7 illustrates the relationship between spin axis and two sensing axes.

Refer now to FIG. 7 in which the spherical (octantal) plates are shown. A line through the centers of diametrically opposed plates defines a ball displacement sensing axis of which there are four. Only two are shown for simplicity. The minus end of the 4-axis is shown as a line emanating from the center of the sphere, piercing the surface of the unit sphere at point $p$ and terminating with an arrowhead labeled $-4$. The plus end of the 1-axis is similarly shown. The spin axis, arbitrarily shown piercing the $-4$ plate, is labeled "$\omega$." The plane formed by the (1,4) axes intersects the surface of the unit sphere at the line $c_1$. The length and position of this line is fixed by the geometry of the plates and definition of the four axes. The $(\omega,-4)$ plane intersects the sphere at line $a_1$. The significance of the $(\omega,-4)$ plane is derived from FIG. 7.

Figure 8:
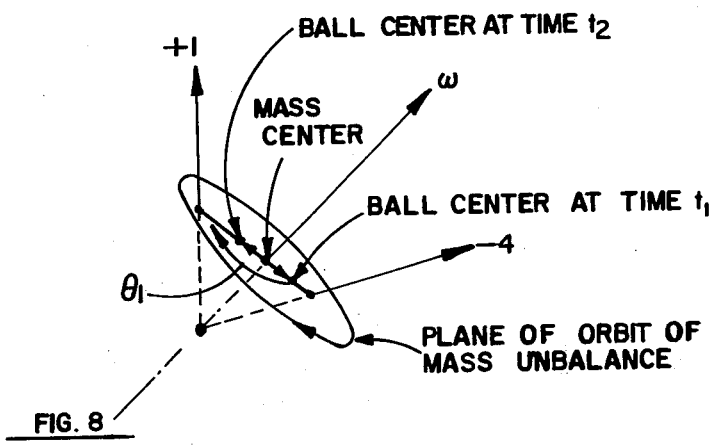
FIG. 8 illustrates the orbital plane of mass imbalance.

The plane of the orbit of mass unbalance is shown in FIG. 8. For purposes of illustration, assume that the ball spins about its mass center and that the center of bouyancy or geometric center of the ball is the center which whirls and consequently defines the plane of orbit. At time $t_1$, in the diagram, the geocenter lies in the $(\omega,-4)$ plane and is thus at its closest approach to the $-4$ sensing axis. Thus the signal from the $-4$ electronic axis is at a maximum. The elapsed time then between a maximum at $-4$ axis and a maximum at the $+1$ axis is $(t_2 - t_1)$. Since the signals are steady state sine waves, the time between positive going zero crossings will also be $(t_2 - t_1)$. This quantity can be determined by standard zero detection and time counting circuits. Since the period T of the sine wave can be determined, then if $(t_2 - t_1)$ is divided by the time of one period of orbit revolution, it will represent the phase angle between the $(\omega,-4)$, $(\omega,+1)$ planes. This phase angle is labeled $\theta_1$. In summary:

$$\theta_1 = 2\pi(t_2 - t_1/T) \tag{5}$$

where
$t_2$ = time of zero crossing of $+1$-axis electronic pickoff signal
$t_1$ = time of zero crossing of $-4$-axis electronic pickoff signal
T = time of period of any axis pickoff signal Referring again to FIG. 7, $\theta_1$ again appears as the angle between the $(\omega,-4)$, $(\omega,+1)$ planes, but this time it is the spherical angle between triangle leg $a_1$ and $b_1$; the intersection between the $(\omega,+1)$ plane and the sphere generates the line $b_1$. If $a_1$ and $b_1$ were known, then the location of the spin axis with respect to two case axes would be known and the problem of locating the gyroscope rotor attitude would be solved. However, given only $c_1$ and $\theta_1$, $a_1$ and $b_1$ can occur in unlimited combinations. This is shown in FIG. 9.

Figure 9:
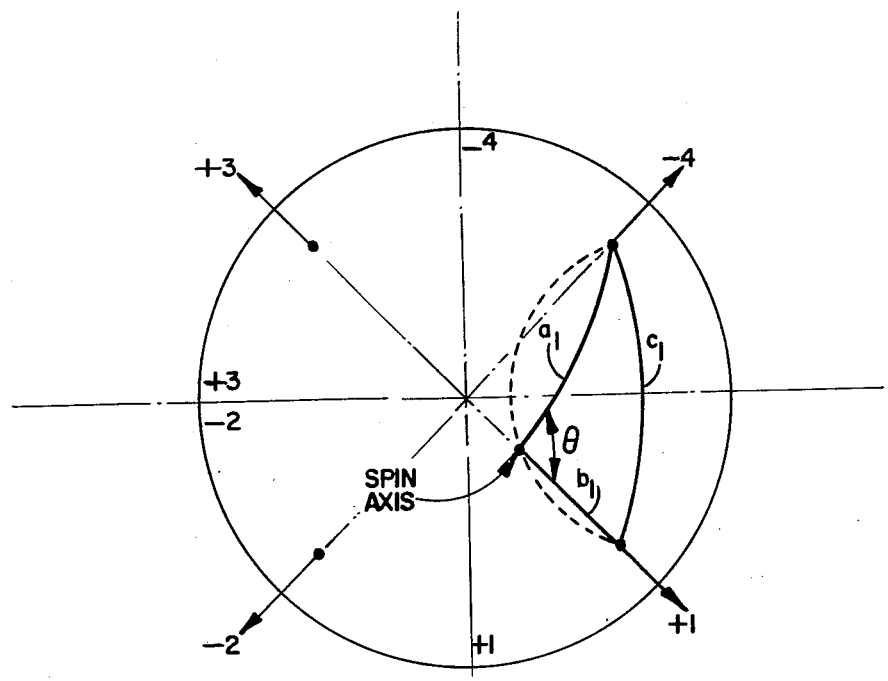
FIG. 9 illustrates the phase angle ambiquity between the pair of sensing axes.

FIG. 9 shows the plates rotated slightly from their positions in FIGS. 7 and 8. The spherical nature of the diagram in FIG. 9 is not as evident as in FIGS. 7 and 8. The many combinations of $a_1$ and $b_1$ for a given $\theta_1$ and $c_1$ result in a unique family of possible spin-axis orientations. They constitute on the sphere a locus of points which will be a curved line connecting the $-4$ and $+1$ axes.

Figure 10:
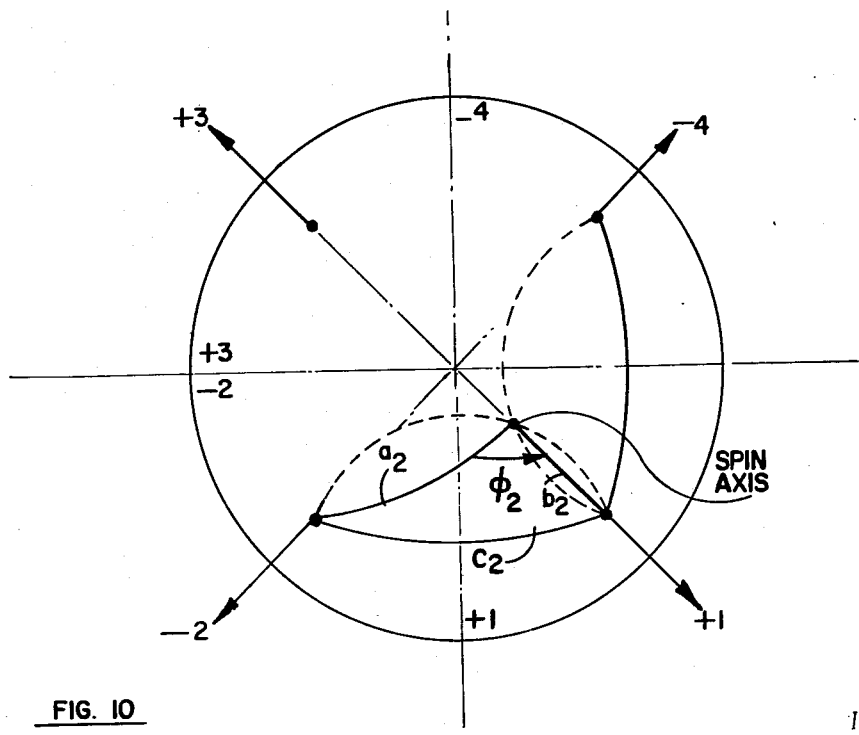
FIG. 10 indicates how ambiquity of phase angle is resolved by adding a third sensing axis.
Figure 11:
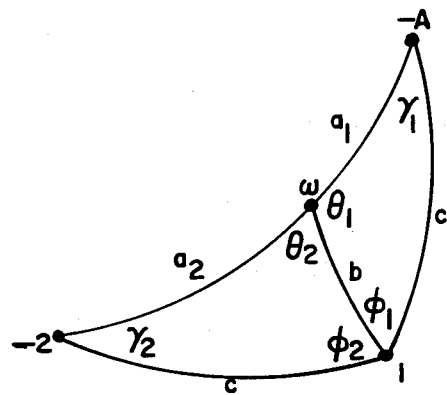
FIG. 11 illustrates the spherical triangle problem.

Measurement of a second phase angle $\theta_2$ between axes $+1$ and $-2$ will generate a second and adjacent spherical triangle, FIG. 10, which also has a locus of points which depends on $c_2$ and $\theta_2$. $c_2$, like $c_1$, is a given, fixed quantity depending on fixed axis geometry.

$$\theta_2 = 2\pi(t_3 - t_2/T) \tag{6}$$

where $t_3$ = time of zero crossing of −2 axis electronic pick-off signal $t_2$ = time of zero crossing of +1-axis electronic pick-off signal The intersection of the two loci in FIG. 10 defines the location of the spin axis. If the spherical triangles in FIG. 11 can be solved for $b$ and $\theta_1$, the spin axis can be defined with respect to the various plate axes used in the measurement of phase angles $\theta_1$ and $\theta_2$.

In review, Equations (5) and (6) reveal that $\theta_1$ and $\theta_2$ are known through measurements involving the elapsed time between zero crossings on selected axis-pairs. It is seen that $c = c_1 = c_2$ is known from geometry and that $\theta = \theta_1 + \theta_2$ is also known from plate geometry. The value of $b = b_1 = b_2$ and $\theta_1$ are desired in terms of the known and measured quantities.

From the law of sines, for the right hand triangle in FIG. 10

$$\sin c = \frac{\sin b \sin \theta_1}{\sin \gamma_1} \qquad \text{Equation (7)}$$

The law of cosines gives $$\cos c = \frac{\cos \theta_1 + \cos \theta_1 \cos \gamma_1}{\sin \theta_1 \sin \gamma_1} \qquad \text{Equation (8)}$$

and $$\cos \gamma_1 = \cos \theta_1 \cos \theta_1 + \sin \theta_1 \sin \theta_1 \cos b \qquad (9)$$

Substituting Equation (9) in (8)

$$\cos c = (1/\sin \gamma_1)(\cos \theta_1 \sin \theta_1 + \sin \theta_1 \cos \theta_1 \cos b) \qquad (10)$$

Dividing Equation (7) by (10)

$$\tan c = \frac{\sin \theta_1 \sin b}{\cos \theta_1 \sin \theta_1 + \sin \theta_1 \cos b \cos \theta_1} \qquad \text{Equation (11)}$$

Similarly for the left hand triangle $$\tan c = \frac{\sin \theta_2 \sin b}{\cos \theta_2 \sin(\theta-\theta_1) + \sin \theta_2 \cos b \cos(\theta-\theta_1)} \qquad \text{(Equation 12)}$$

Equations (11) and (12) are two equations in the two unknowns, $b$ and $\theta_1$. Among other solution possibilities, $b$ and $\theta_1$ may be obtained through iterative numerical techniques on a digital computer.

Figure 12:
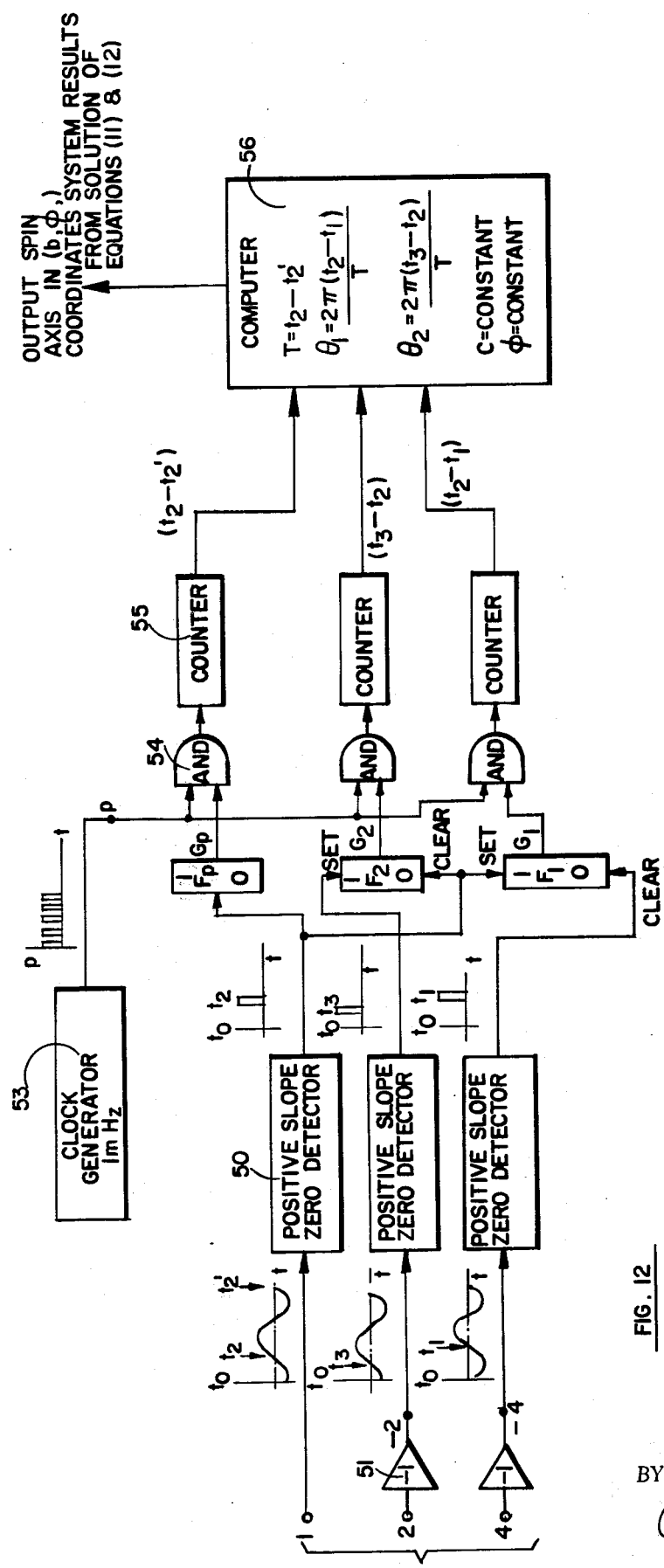
FIG. 12 illustrates a means for measuring phase angle.

A simplified circuit for obtaining spin axis position in the $(b, \theta_1)$ coordinate system is illustrated in FIG. 12. The time of the positive slope zero crossing on channel (axis) 1 is defined at time $t_2$ as in Equation (5). The next crossing is $t_2'$. The time elapsed between $t_2$ and $t_2'$ is measured in microseconds and is called T, the period of the MUM signal. Channels 2 and 4 pass through an inverter 51 to give the −2 and −4 axes response which is required by Equations (5) and (6). The three channels of signals each pass through their own positive slope zero crossing detector 50. The outputs are logic type pulses which occur at times $t_2$, $t_3$ and $t_1$ for the channels 1, −2, and −4, respectively. Flip flop $F_1$ is set "ON" by the event $t_2$ and is cleared to an "OFF" state at the event $t_1$. $G_1$ is the state of $F_1$ and is used to gate the 1 megahertz pulse train, P, from clock generator 53, through an "AND" gate 54 into a pulse counter 55. Since pulse train P is fed into the counter at time $t_2$ and blocked at time $t_1$, the contents of the counter of $t_1$ time is $(t_2 - t_1)$ microseconds. Flip flop $F_p$ is turned "ON" at $t_2$ time and "OFF" at time $t_2'$. Thus $G_p$ gates P into the counter for one period. That counter then reads $(t_2 - t_2') = T$ microseconds. Flip flop $F_2$ is set "ON" at time $t_3$ and "OFF" at time $t_2$. Thus $G_2$ gates P into its counter for a count of $(t_3 - t_2)$ microseconds. Standard synchronizing and counter reset controls are not shown since pulse counting techniques are well known in the art.

The counter outputs are fed to a digital computer 56 where $\theta_1$ and $\theta_2$ are computed according to Equations (5) and (6). The inputs C and 0 are applied to computer 56 as constants which have been previously determined by the gyro geometry. Equations (11) and (12) are solved simultaneously and alternatively to obtain as an output the location of the spin axis in the $(b, \phi_1)$ coordinate frame. A standard coordinate conversion frame $(b, \phi)$ to direction cosines $(\omega_x, \omega_y, \omega_z)$ in a case fixed orthogonal $(x, y, z)$ coordinate system is desirable.

In most cases the sinusoidal MUM signals coming from the signal conditioner contain random electrical and vibrational noise plus schematic noise due to rotor asphericity. The noise can cause timing errors in the output of the zero crossing detectors. It is, therefore, desirable to filter the MUM signals to remove possibilities of errors. A narrow bandpass filter is desirable, however, since the rotor speed is subject to long term drift the filter passband must track rotor speed. A tracking narrow band pass filter can be accomplished with a phaselock loop.

Figure 13:
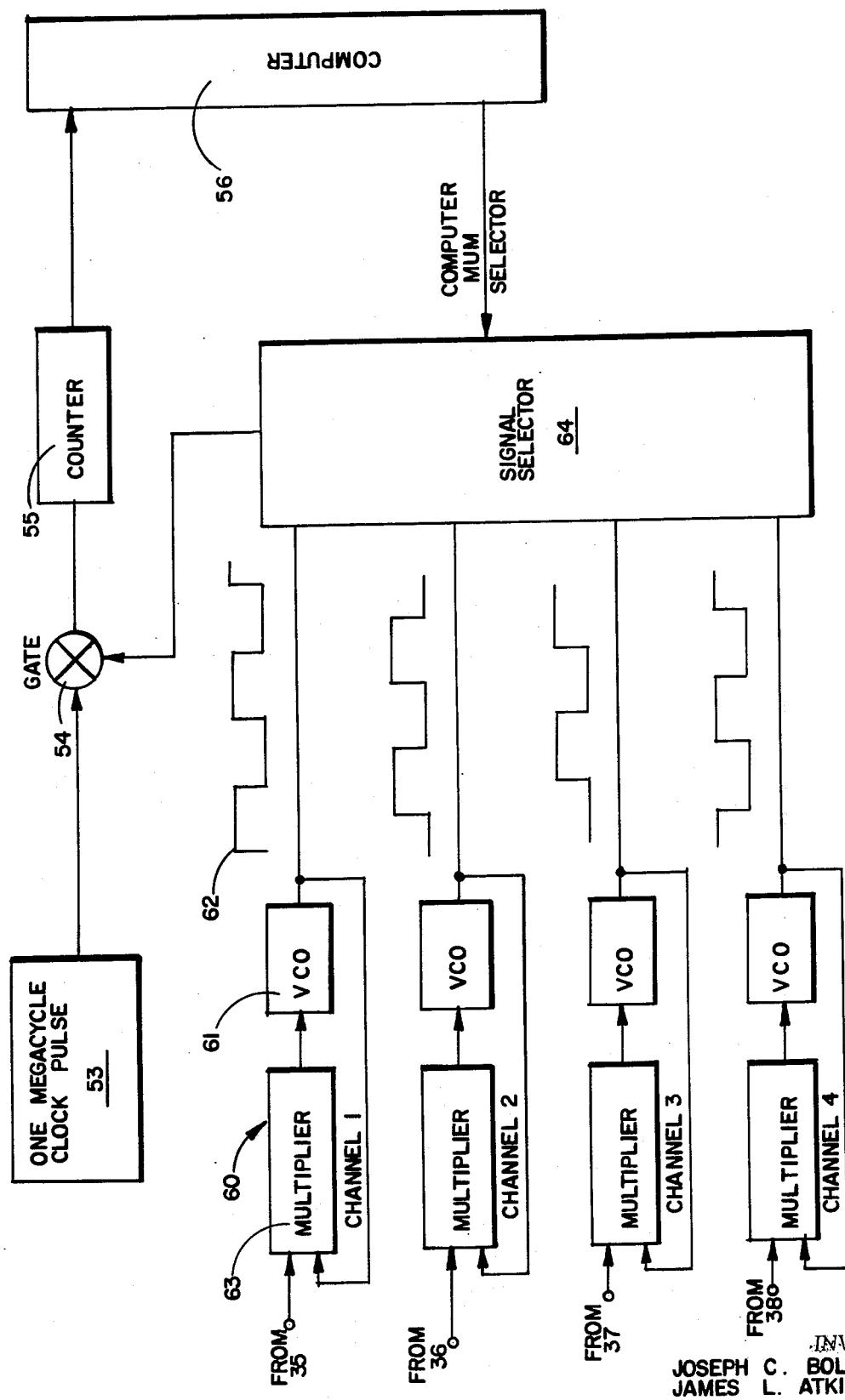
FIG. 13 illustrates a circuit means for processing mass unbalance modulation signals.

FIG. 13 shows a suitable system arrangement for determining spin axis position utilizing a phase lock loop. Noise contained in the raw MUM signals is removed by means of the phase lock loop circuit 60 for each of the four MUM channels having inputs from 35, 36, 37 and 38 in FIG. 5. Each phase lock loop operates according to standard art techniques and is comprised of a multiplier 63 and a voltage controlled oscillator (VCO) 61. The output from VCO 61 is then fed back to the input of the multiplier 63, along with the input signal from 35 the axis or channel 1. The output from the multiplier 63 controls the frequency of the VCO 61. The output of each phase lock loop 60 is a square wave signal 62 locked in phase with the fundamental component of that channel's MUM signal. The square waves 62 are then used in place of the MUM signals. The computer 56 selects the appropriate pair of square waves for the generalized phase-time counter 55 through a signal selector 64 as described in connection with the circuits of FIG. 12.

There will be almost no MUM signal on channel 1 since, of course, the ball does not have orbital displacement along the spin axis, only normal to it.

Figure 14:
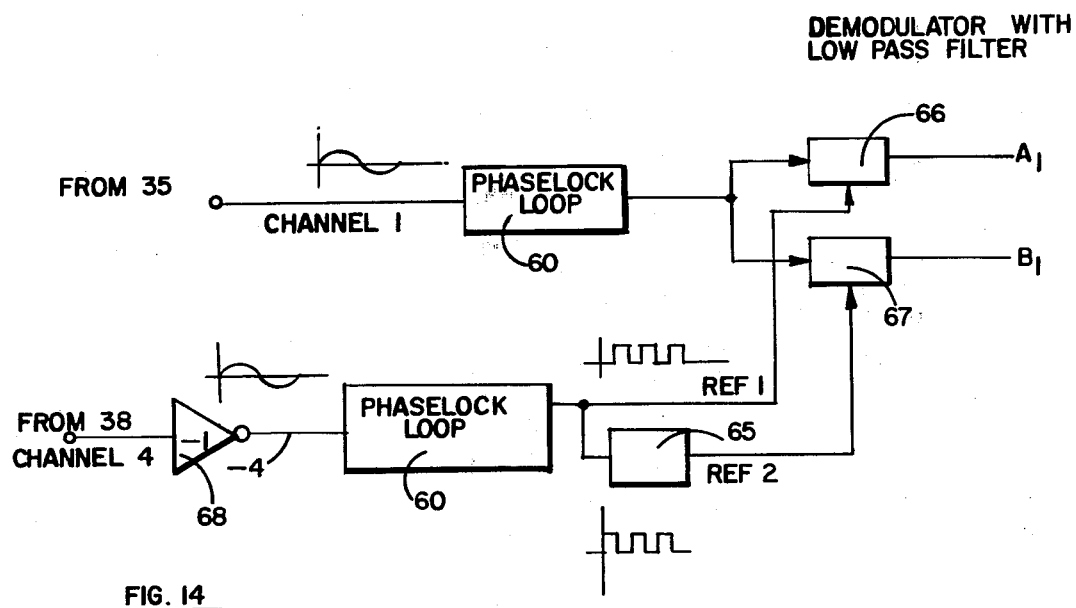
FIG. 14 illustrates a small angle pickoff mechanization.

Referring now to FIG. 14 in conjunction with FIG. 13, if the spin axis were exactly colinear with the 1-axis, the MUM signal on channel 1 would be zero. The phase lock loop 60 on channel 4 in FIG. 14 then feeds its signal to a 90° phase shifter 65 so as to provide two square wave signals 90° out of phase with each other, designated REF 1 and REF 2. An inverter inverts the input signal from 38 to the phase lock loop. The two REF signals are locked in phase with the ball spin rate, which is the MUM signal frequency. These two REF coherent signals are used as a sine and cosine demodulator reference signal for demodulators 66 and 67, respectively. The input to the demodulators is the signal from the terminal 35 of channel 1. The signal can be designated $e_1$ where $e_1$ is of the form:

$$e_1 = E_1 \cos(\omega_r t + \theta_1) \tag{13}$$

where
$E_1$ is the magnitude of the MUM signal and is proportional to the angular tilt between the spin axis and the 1-axis,
$\omega_r$ is the ball spin rate, and
$\theta_1$ is the same phase angle as $\theta_1$ in FIG. 8.
Also:

$$REF_1 = \sin\omega_r t \tag{14}$$

$$REF_2 = \cos\omega_r t \tag{15}$$

A demodulator is represented as a multiplier thus:

$$A_1 = e_1 \cdot REF_1$$

$$A_1 = E_1 \sin\theta_1 \tag{16}$$

after the filter removes the harmonics of ball spin rate. Similarly $$B_1 = e_1 REF_2$$

$$B_1 = E_1 \cos\theta_1 \tag{17}$$

Referring to FIG. 8, let the spin axis $\omega$ circle closely about the +1-axis. It can be seen that one complete revolution of $\omega$ axis about +1-axis results in $\theta_1$ varying in value from 0 to 360°. For example, the MUM vector (arrow normal to $\omega$ axis with ball center at its tip) will point first at −4-axis, then half a revolution later point at +1-axis where $\omega$ axis lies in the (+1, −4) plane and further, lies between the two axes. In this case $\theta_1 = 180°$. When $\omega$ axis circles (or cones) to the opposite side of the +1-axis and again lies in the (+1, −4) plane, the MUM vector will point at both axes at the same time; thus, $\theta_1 = 0°$. In other words, $\theta_1$ is uniquely defined by the location of $\omega$ axis with respect to the +1 axis and the axes of phase lock, the −4-axis in this example. Now it can be seen that Equations 16 and 17 are the rectangular coordinates of the spin axis in a (+1, −4) axis coordinate frame. The signals, then, are the typical two-axis gyroscope pickoff signals which may be utilized in a manner identical to other types of two-axis gyroscope pickoff signals.

The invention is not limited in its application to the particular octahedral electrode arrangement described. It is desirable that the electrodes by symmetrical, as this permits identical circuits for each electrode, but within this limitation electrode set can be employed corresponding to the five regular polyhedron. Thus, there can be four electrodes in tetrahedral symmetry, or six in cubical, eight in octahedral, twelve in dodecahedral or twenty in icosahedral symmetry.

While there has been disclosed what is considered to be the preferred embodiment of the invention, it will be manifest that many changes and modifications may be made therein without departing from the essential spirit of the invention.

I claim:

1. A gyroscope comprising:
    a case;
    a ball adapted to be spun about a spin axis, said ball being provided with a radial unbalance so that said ball orbits as it spins about the spin axis;
    a set of electrostatic electrodes disposed within said case and in a three dimensional array about said ball;
    circuit means for establishing electrical field signals between said electrodes and said ball;
    pickoff means associated with said electrodes and responsive to the approach and recession of said ball for modulating the electrical field signals between said ball and said electrodes in a phase and amplitude pattern unique to the particular orientation of the spin axis of said ball relative to said electrodes;
    signal circuits coupled to said pickoff means for demodulating the modulated electrical field signals to develop demodulated signals;
    means responsive to the demodulated signals for developing phase information signals indicative of the attitude of the spin axis of said ball relative to said set of electrodes; and
    computing means responsive to the phase information signals for computing the attitude of the spin axis of said ball relative to said set of electrodes.

2. An electrostatic gyroscope comprising:
    a mass unbalanced conductive ball adapted to be spun around a spin axis;
    a plurality of electrodes positioned around said ball;
    servo means for selectively providing electrical signals to said plurality of electrodes to freely suspend said ball among said electrodes, the electrical signal at each electrode being modulated at the spin frequency of said ball as said ball moves away from or toward the electrode; and
    first means for measuring the phase relationships of the modulated electrical signals to develop a plurality of phase signals indicative of the attitude of said ball relative to said plurality of electrodes.

3. An electrostatic gyroscope comprising:
    a mass unbalanced conductive ball adapted to be spun around a spin axis;
    a plurality of electrodes positioned around said ball;
    means for selectively providing electrical signals to said plurality of electrodes to freely suspend said ball among said electrodes, the electrical signal at each electrode being modulated at the spin frequency of said ball as said ball moves away from or toward the electrode;
    means for demodulating the modulated electrical signals to develop sinasoidal demodulated signals; and
    means responsive to the sinasoidal demodulated signals for developing output signals containing phase information indicative of the attitude of said ball relative to said set of electrodes.

4. The electrostatic gyroscope of claim 3 wherein said developing means includes:
    means responsive to the sinasoidal demodulated signals for generating a plurality of logic time signals;
    a source of clock pulses; and
    means for selectively counting a plurality of sequences of clock pulses as a function of the plurality of logic time signals to develop the output signals.

5. The electrostatic gyroscope of claim 4 further including:
    computing means responsive to the output signals for computing the attitude of said ball relative to said plurality of electrodes.

6. The electrostatic gyroscope of claim 4 wherein said generating means includes:

a plurality of detectors for generating the plurality of logic time signals as functions of the phases of the sinasoidal demodulated signals.

7. The electrostatic gyroscope of claim 6 wherein said counting means includes:
a plurality of gating means responsive to the clock pulses and to the plurality of logic time signals for developing a plurality of sequences of clock pulses; and
a plurality of counters for respectively counting the plurality of sequences of clock pulses to develop the output signals.

8. The electrostatic gyroscope of claim 7 further including:
computing means responsive to the output signals for computing the attitude of said ball relative to said plurality of electrodes.

9. An electrostatic gyroscope comprising:
a mass unbalanced conductive ball adapted to be spun around a spin axis;
a plurality of electrodes positioned around said ball;
means for selectively providing electrical signals to said plurality of electrodes to freely suspend said ball among said electrodes, the electrical signal at each electrode being modulated at the spin frequency of said ball as said ball moves away from or toward the electrode;
means for demodulating the modulated electrical signals to develop demodulated signals; and
means responsive to the demodulated signals for developing output signals containing phase information indicative of the attitude of said ball relative to said set of electrodes, said developing means including:
means responsive to the demodulated signals for generating a plurality of logic time signals, said generating means including a plurality of phase lock loops for generating the plurality of logic time signals, each of the logic time signals being a square wave signal locked in phase with the associated demodulated signal;
a source of clock pulses; and
means for selectively counting a plurality of sequences of clock pulses as a function of the plurality of logic time signals to develop the output signals.

10. The electrostatic gyroscope of claim 9 wherein said counting means includes:
a gate circuit;
a counter; and
means for selectively allowing the plurality of logic time signals to sequentially enable said gate circuit to pass a plurality of sequences of clock pulses to said counter to be counted, said counter selectively counting the plurality of sequences of clock pulses to develop the output signals.

11. The electrostatic gyroscope of claim 10 further including:
computing means responsive to the output signals for computing the attitude of said ball relative to said plurality of electrodes.

12. An electrostatic gyroscope comprising:
a mass unbalanced conductive ball adapted to be spun around a spin axis;
a plurality of electrodes positioned around said ball;
means for selectively providing electrical signals to said plurality of electrodes to freely suspend said ball among said electrodes, the electrical signal at each electrode being modulated at the spin frequency of said ball as said ball moves away from or toward the electrode;
means for demodulating the modulated electrical signals to develop demodulated signals; and
means responsive to the demodulated signals for developing output signals containing phase information indicative of the attitude of said ball relative to said set of electrodes, said developing means developing first and second output signals, each output signal containing a composite of both phase and amplitude components, said first and second output signals being indicative of the attitude of the spin axis of said ball relative to preselected ones of said electrodes, said developing means including:
means responsive to a first one of said demodulated signals for producing first and second reference signals in phase quadrature with each other, said producing means including: a phase lock loop for locking the first one of said demodulated signals in phase with the rate at which said ball is spun around its spin axis in order to develop the first reference signal; and a phase shifter for shifting the phase of the first reference signal by substantially 90° to develop the second reference signal; and
demodulation means responsive to the first and second reference signals and to a second one of said demodulated signals for developing the first and second output signals.

13. The electrostatic gyroscope of claim 12 wherein said second means further includes:
an inverter for inverting the first one of said demodulated signals before it is applied to said phase lock loop.

14. The electrostatic gyroscope of claim 12 wherein said demodulation means includes:
first and second demodulators respectively responsive to the first and second reference signals for demodulating the second one of said demodulated signals to develop the first and second output signals.

* * * * *